Aug. 12, 1952
E. L. MAYO
2,606,718
THERMOSTAT VALVE MOUNTING
Filed Aug. 14, 1950
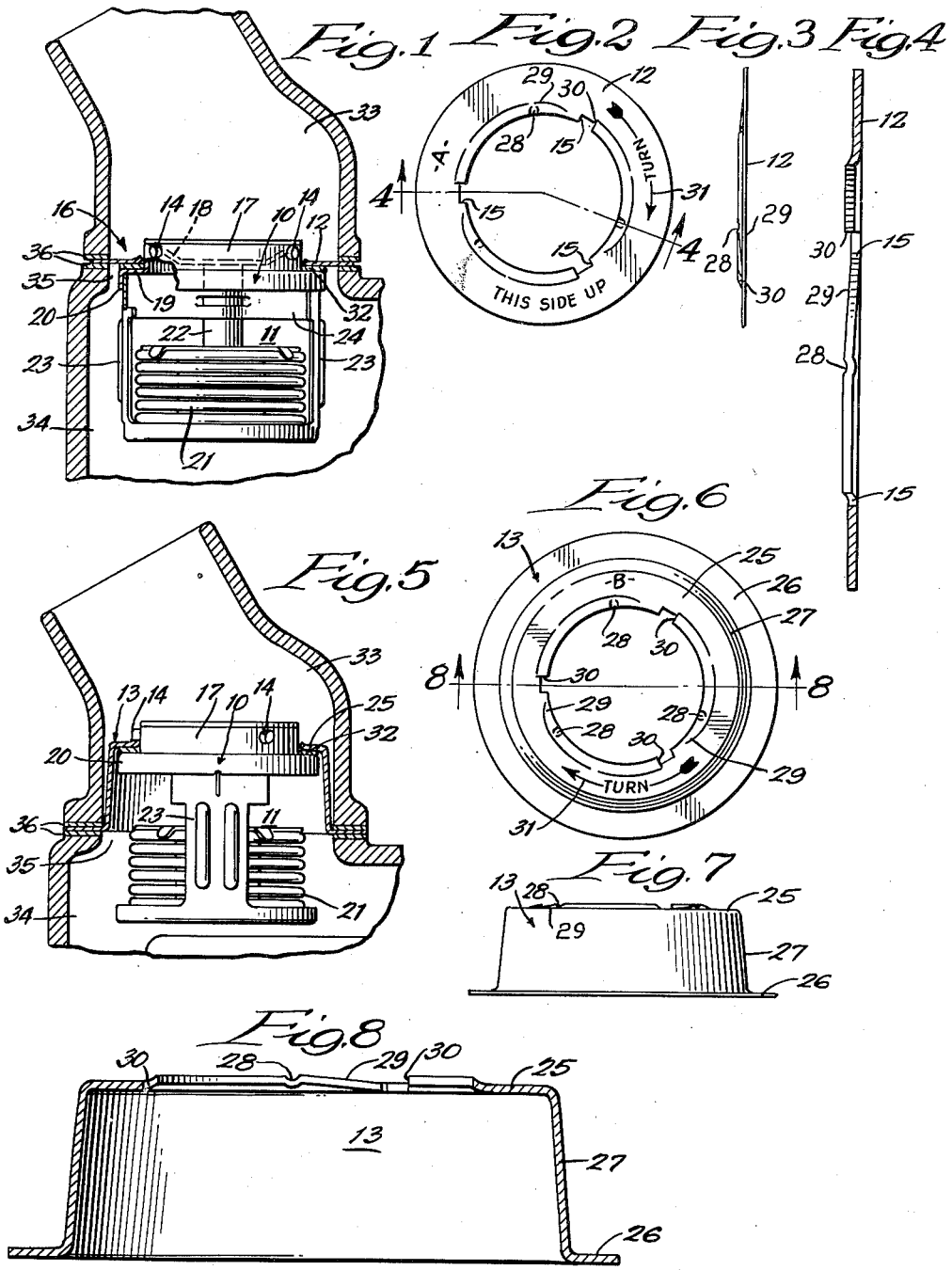
INVENTOR.
Edward L. Mayo,
BY
Brown, Jackson, Boettcher & Dienner,
ATTORNEYS.

Patented Aug. 12, 1952

2,606,718

UNITED STATES PATENT OFFICE 2,606,718

THERMOSTAT VALVE MOUNTING

Edward L. Mayo, Cleveland, Ohio, assignor to The Bishop & Babcock Manufacturing Company, Cleveland, Ohio, a corporation of Ohio Application August 14, 1950, Serial No. 179,345

8 Claims. (Cl. 236—34)

1

This invention relates to thermostatically-controlled valve assemblies for use in regulating the flow of a cooling liquid for internal combustion engines or analogous purposes.

As is well known, manufacturers of internal combustion engines, such as used for automotive equipment, independently determine their own designs. Although there is much that is conventional about the features of such engines, there is little or no standardization of some details of the structures which embody these conventional features.

One of the conventional features is the provision of a connection on the engine head for the attachment of a hose conduit affording a flow of the cooling fluid between the engine and a radiator. This connection generally provides for the insertion of a thermostatically-controlled valve assembly for regulating the flow of coolant between the engine and the radiator. Inasmuch as each manufacturer determines for itself the form, size, and positioning of this connection the manufacturers of thermostatically-controlled valve assemblies have to accommodate their products to the varying structures of the several engine manufacturers. For the manufacturer and the supplier of this accessory it often means large inventories, some parts of which are very slow in moving. Obviously, it is costly to have funds tied up in slow moving products.

The main objects of this invention, therefore, are to provide an improved form of mounting for thermostatically-controlled valve assemblies used in regulating the flow of a cooling fluid for internal combustion engines; to provide an improved form of mounting of this kind whereby a detachable member renders a standardized valve assembly available for use with the engines of a wide range of manufacturers; to provide an improved form of detachable mounting member or adapter two of which may be variously constructed to further increase the range of engines wherewith a standardized valve assembly may be used; and to provide an improved form of mounting for thermostatically-controlled valve assemblies of this kind which is economical to manufacture, very facile to use, and hence materialy reduces the types of valve assembly which have to be produced and kept on hand to accommodate the requirements of the various manufacturers and the multitude of users of internal combustion engines, particularly in automotive equipment.

In the accompanying drawings:

Fig. 1 is a vertical, sectional view through the coolant connection of an engine head and a fitting leading to a radiator, showing in position a thermostatically-controlled valve assembly mounted in said connection by an adapter constructed in accordance with this invention;

Fig. 2 is a plan view of the adapter;

Fig. 3 is a side elevation of the same;

Fig. 4 is a much-enlarged, cross-sectional view of the adapter taken on the line 4—4 of Fig. 2;

Fig. 5 is a view similar to Fig. 1 but showing the valve assembly positioned in the coolant connection by a modified form of adapter;

Fig. 6 is a plan view of the modified form of adapter shown in Fig. 5;

Fig. 7 is a side elevation of the same; and

Fig. 8 is a much-enlarged, cross-sectional view of the modified adapter taken on the line 8—8 of Fig. 6.

The essential concept of my invention involves the provision of a pair of separable members of different outer diameters, the member of smaller outer diameter being a valve assembly supporting member and the member of larger outer diameter being an adapter selected from a group of adapters which may be of different sizes or shapes, or both, the mounting member and the adapter having means for locking them together in properly assembled relation to provide a unit positionable in the liquid cooling connection for any of the engines of several different manufacturers.

The particular embodiment of this invention herein shown comprises a supporting member 10, whereon a valve assembly 11 is arranged, and two forms of a mounting member 12 and 13 which mounting members are respectively provided with shoulders 14 and recesses 15 so arranged as to permit the telescopic assembly and partial relative rotation of either of the mounting members 12 or 13 and the supporting member 10 for locking them together whereby the member 12 or 13 is adapted to locate the valve assembly 11 in a functioning position in a cooling liquid connection 16 for an internal combustion engine.

The supporting member 10, whereon is arranged the valve assembly 11, is in the form of a metal stamping providing a vertical ring 17, on the upper end of which a valve 18 seats, and a horizontal base flange 19. The outer edge of the flange 19 extending radially outward from ring 17 is bent downward to form a short vertical flange 20, extending oppositely to the ring 17.

The valve assembly 11 is of a more or less standardized construction involving the valve 18, an actuating bellows 21, a valve stem 22, and a supporting strap 23.

The valve 18 is a frusto-conical stamping shaped to seat on the upper end of the ring 17 for controlling the opening and closing of the passage through said ring 17.

The bellows 21 is a conventional structure containing a fluid which is affected by temperature changes so as to expand and contract the bellows and thereby effect a shifting of the valve 18. The bellows 21 is set on the base of the strap 23 which is suspended from the supporting element 10. The valve stem 22 is anchored to the valve 18 after an appropriate adjustment of the bellows to effect the desired movement of the valve by predetermined temperature conditions of the engine coolant. The stem 22 is slidably supported on the guide 24 spanning and attached at its ends to the upper ends of the strap 23.

The mounting members 12 and 13, conventionally designated as "A" and "B" respectively, are generally similar, both being annular stampings. The member 13, however, has the portion intermediate the inner and outer perimeters drawn axially so that it is somewhat cap-shaped with the oppositely-extending, upper and lower, radially-disposed flanges 25 and 26 separated by an axially-disposed part or wall 27.

The radius of the inner diameter of the respective members 12 and 13 is slightly greater than the radius of the exterior diameter of the ring 17 of the supporting member 10 and consequently less than the radial distance from the axis of ring 17 to the radially outer ends of the respective shoulders 14.

The shoulders 14 are in the form of rivets or pins, three of which are secured circumferentially around and project beyond the exterior of the ring 17. The recesses 15 extend inwardly from the inner perimeter of the mounting members 12 and 13, being angularly spaced to register with the shoulders 14. Such an arrangement of shoulders 14 and recesses 15 permit the telescopic assembly of either of the mounting member 12 or 13, between the recesses 15, interporting member 10, and their relative partial rotation to locate perimetrical portions of the members 12 or 13, between the recesses 15, intermediate the shoulders 14 and the flange 19 whereby the mounting member 12 or 13 may be depended upon to locate the valve assembly 11 in functioning position in the liquid connection 16.

In order to lock these members in their relatively shifted positions, insure the sealing of the space between these superimposed members, and prevent relative rotation of the members in the wrong direction, seats 28, cam elements 29, and stop shoulders 30 are formed on the perimetrical portions of the members 12 and 13 adjacent the recesses 15.

The seats 28 take the form of shallow, radially-extending depressions a short circumferential distance from the respective recesses 15, wherein the shoulders 14 are adapted to seat when the members 10 and 12 or 13 are given a partial relative rotation in the direction of the designated arrow 31, formed in the face of each of these mounting members 12 and 13.

The cam elements 29 are formed by slightly off-setting, from the plane of the member 12 and 13, the perimetrical portion of these members intermediate each recess 15 and the adjacent seat 28, the offset tapering from the seat 28 to the recess 15, as most clearly appears in Figs. 4 and 8. Thus, during a relative rotation of the member 12 or 13 and the member 10, the shoulders 14 contacting these cam surfaces 29 will press the member 12 or 13 axially toward the flange 19 of the supporting member 10.

In order to insure a sealing of this annular space between these members, a gasket 32, of suitable compressible material, is placed on the flange 19 inwardly of the shoulders 14. It is held in place thereon by the shoulders 14 when either of the members 12 or 13 are not superimposed on the member 10.

The stop shoulders 30 are formed by simply upsetting slightly the edge of the perimetrical portion of the elements 12 and 13 which defines the respective recesses opposite the cam elements 29. (See Figs. 4 and 8.)

The connection 16, wherein a valve assembly 11 of this type is adapted to be located by one or the other of the mounting members 12 or 13, comprises a fitting 33 suitably bolted to the engine head 34 over the outlet port 35. A section of hose conduit (not shown) connects the fitting 33 to a suitable radiator through which the engine coolant is circulated to dissipate the heat generated by the operation of the engine.

Each manufacturer of engines determines for itself the precise form and arrangement of such an outlet port 35, the defining walls of the engine head 34, and the form of the fitting 33. As a result the diameters of these ports and their location for different makes of engines generally vary somewhat. Moreover, by reason of the type of engine—number of cylinders, the horse power, the arrangement of the valve mechanism, etc.— the depth of the coolant chamber in the engine head 34 may vary in the engines of different manufacturers. All of this has generally required the manufacturers of these thermostatically-operated valve assemblies to form a special mounting for each make of engine, or possibly a group of engines where the forms and arrangements of these ports 35 were such that one mounting would permit the use of a certain valve assembly with several makes of engines. Notwithstanding such possibilities, the manufacturer and supplier of these valve assemblies has had to stock a great variety of these assemblies, some of which have proven of small demand.

By providing these two forms of adapter-mounting members 12 and 13 a standardized valve assembly 11, after attaching one or the other of these members, can be used in a major proportion of the engines of different manufacturers. Where the diameter of the port 35 and the depth of the adjacent engine head coolant-chamber will permit, an adapter-member 12 would be used for locating the valve assembly 11 in functioning position in the liquid connection 16, as shown in Fig. 1. With other engine constructions, where the coolant-chamber is more shallow, the use of the mounting member 13 would locate the valve assembly 11 in proper functioning position in the connection 16, as shown in Fig. 5.

When used, the mounting member 12 or 13 is placed on the valve assembly 11 by passing the mounting member down over the supporting member ring 17 with the recesses 15 in registration with the shoulders 14. Thereupon, the mounting member 12 or 13 is given a slight turn in the direction of the arrow 31. This causes the cam elements 29 to press the member 12 or 13 down against the gasket 32 so as to seal the space between these superimposed elements. The relative turning of the members also seats the shoulders 14 in the depressions 28. Thereupon the valve assembly 11 may be located in functioning position in the outlet port 35 with the outer perimeter of the member 12 or 13 interposed between the fitting 33 and the engine head 34. Obviously, suitable gaskets 36 would be interposed between the mounting member 12 or 13 and the opposed faces of the fitting 33 and the engine head 34.

Other variations and modifications in the details of structure and arrangement of the parts may be resorted to within the spirit and coverage of the appended claims.

I claim:

1. In means for mounting a thermostat valve in the coolant outlet passage of an internal combustion engine, a thermostat valve assembly comprising a supporting ring having an outwardly extending radial flange and provided with a series of outwardly extending radial shoulders spaced axially of said ring from said flange, and a mounting member comprising a ring having an inner diameter greater than the outer diameter of said supporting ring but less than the outer diameter of said supporting ring and shoulders and an outer diameter greater than the outer diameter of said flange, said mounting member being adapted to position said valve assembly in functioning position in the coolant outlet passage of an internal combustion engine, said mounting member ring having recesses extending from its inner periphery disposed and adapted to receive said shoulders to permit telescopic assembly and relative rotation of said rings, said mounting member ring having elements cooperating with said shoulders for locking said rings together responsive to such relative rotation thereof.

2. In means for mounting a thermostat valve in the coolant outlet passage of an internal combustion engine, a thermostat valve assembly comprising a supporting ring having an outwardly extending radial flange, and a mounting member comprising a ring having an inner diameter and an outer diameter respectively greater than the inner diameter of said supporting ring and the outer diameter of said flange, said rings having cooperating shoulders and recesses disposed and adapted to permit telescopic assembly and relative rotation of said rings and to lock them together responsive to such relative rotation, said mounting member being adapted to position said valve assembly in functioning position in the coolant outlet passage of an internal combustion engine.

3. In means for mounting a thermostat valve in the coolant outlet passage of an internal combustion engine, a thermostat valve assembly comprising a supporting ring having an outwardly extending radial flange and provided with a series of outwardly extending radial shoulders spaced axially of said ring from said flange, a mounting member comprising a ring having an inner diameter greater than the outer diameter of said supporting ring but less than the outer diameter of said supporting ring and shoulders and an outer diameter greater than the outer diameter of said flange, said mounting member being adapted to position said valve assembly in functioning position in the coolant outlet passage of an internal combustion engine, said mounting member ring having recesses extending from its inner periphery disposed and adapted to receive said shoulders to permit telescopic assembly and relative rotation of said rings, said mounting member ring having elements cooperating with said shoulders for locking said rings together responsive to such relative rotation thereof, and coacting means on said supporting ring and said mounting member limiting relative turning thereof in locking direction.

4. In means for mounting a thermostat valve in the coolant outlet passage of an internal combustion engine, a thermostat valve assembly comprising a supporting ring having an outwardly extending radial flange and provided with a series of outwardly extending radial shoulders spaced axially of said ring from said flange, and a mounting member comprising a ring having an inner diameter greater than the outer diameter of said supporting ring but less than the outer diameter of said supporting ring and shoulders and an outer diameter greater than the outer diameter of said flange, said mounting member being adapted to position said valve assembly in functioning position in the coolant outlet passage of an internal combustion engine, said mounting member ring having recesses extending from its inner periphery disposed and adapted to receive said shoulders to permit telescopic assembly and relative rotation of said rings, said mounting member ring having a seat spaced circumferentially thereof from one of said recesses and disposed and adapted to receive one of said shoulders to lock said rings in the rotative relationship to which they are turned.

5. In means for mounting a thermostat valve in the coolant outlet passage of an internal combustion engine, a thermostat valve assembly comprising a supporting ring having an outwardly extending radial flange and provided with a series of outwardly extending radial shoulders spaced axially of said ring from said flange, and a mounting member comprising a ring having an inner diameter greater than the outer diameter of said supporting ring but less than the outer diameter of said supporting ring and shoulders and an outer diameter greater than the outer diameter of said flange, said mounting member being adapted to position said valve assembly in functioning position in the coolant outlet passage of an internal combustion engine, said mounting member ring having recesses extending from its inner periphery disposed and adapted to receive said shoulders to permit telescopic assembly and relative rotation of said rings, said mounting member ring having elements cooperating with said shoulders for locking said rings together responsive to such relative rotation thereof, said mounting ring member being deflected toward said shoulders at an end of one of said recesses providing a stop cooperating with one of said shoulders to prevent turning of said mounting member in one direction relative to said supporting ring.

6. In means for mounting a thermostat valve in the coolant outlet passage of an internal combustion engine, a thermostat valve assembly comprising a supporting ring having an outwardly extending radial flange and provided with a series of outwardly extending radial shoulders spaced axially of said ring from said flange, and a mounting member comprising a ring having an inner diameter greater than the outer diameter of said supporting ring but less than the outer diameter of said supporting ring and shoulders and an outer diameter greater than the outer diameter of said flange, said mounting member being adapted to position said valve assembly in functioning position in the coolant outlet passage of an internal combustion engine, said mounting member ring having recesses extending from its inner periphery disposed and adapted to receive said shoulders to permit telescopic assembly and relative rotation of said rings, said mounting member ring having a seat spaced circumferentially thereof from one of said recesses and disposed and adapted to receive one of said shoulders to lock said rings in the rotative relationship to which they are turned and being deflected toward said shoulders at an end of one of said recesses providing a stop cooperating with one of said shoulders to prevent turning of said mounting member in one direction relative to said supporting ring.

7. In means for mounting a thermostat valve in the coolant outlet passage of an internal combustion engine, a thermostat valve assembly comprising a supporting ring having an outwardly extending radial flange, a mounting member comprising a ring having an inner diameter and an outer diameter respectively greater than the outer diameter of said supporting ring and the outer diameter of said flange, and a shoulder extending radially outward from said supporting ring and spaced axially thereof from said flange, said mounting member ring having a recess extending from its inner periphery disposed and adapted for reception of said shoulder to permit telescopic assembly and relative rotation of said rings for locking them together, said mounting ring being adapted to locate said valve assembly in functioning position in the coolant outlet passage of an internal combustion engine and having a seat formed in its inner peripheral edge portion spaced circumferentially thereof from said recess and adapted to receive said shoulder to hold said rings in the rotative relationship to which they are turned, the inner peripheral portion of said mounting ring intermediate said recess and said seat being distorted from the plane of said mounting ring so that the relative rotation of said rings to engage said shoulder and seat causes said shoulder to press said mounting ring toward said flange.

8. In means for mounting a thermostat valve in the coolant outlet passage of an internal combustion engine, a thermostat valve assembly comprising a supporting ring having an outwardly extending radial flange and provided with a series of outwardly extending radial shoulders spaced axially of said ring from said flange, a gasket embracing said ring and seating on said flange, a mounting member comprising a ring having an inner diameter greater than the outer diameter of said supporting ring but less than the outer diameter of said supporting ring and shoulders and an outer diameter greater than the outer diameter of said flange, said mounting member being adapted to position said valve assembly in functioning position in the coolant outlet passage of an internal combustion engine, said mounting member ring having recesses extending from its inner periphery disposed and adapted to receive said shoulders to permit telescopic assembly and relative rotation of said supporting ring and mounting member and being provided with elements cooperating with said shoulders for locking said supporting ring and said mounting member in rotative adjustment, said mounting member having portions thereof deflected toward said shoulders and contacted thereby in the relative rotative movement of said supporting ring and mounting member effective for pressing said gasket tightly against said flange.

EDWARD L. MAYO.

REFERENCES CITED

The following references are of record in the file of this patent:

UNITED STATES PATENTS

| Number | Name | Date |
|---|---|---|
| 712,929 | Hedstrom | Nov. 4, 1902 |
| 1,131,399 | McGinley | Mar. 9, 1915 |
| 1,257,011 | Morris | Feb. 19, 1918 |
| 1,801,872 | Morston | Apr. 21, 1931 |
| 1,974,379 | Roby | Sept. 18, 1934 |
| 2,106,406 | Heaney | Jan. 25, 1938 |
| 2,170,010 | Conner | Aug. 22, 1939 |
| 2,187,886 | Mayo | Jan. 23, 1940 |
| 2,241,773 | Ernolf | May 13, 1941 |
| 2,249,576 | Payne | July 15, 1941 |
| 2,406,502 | Lines | Aug. 27, 1946 |

FOREIGN PATENTS

| Number | Country | Date |
|---|---|---|
| 4,895 | Great Britain | of 1895 |